(12) United States Patent
Feliss et al.

(10) Patent No.: US 7,907,062 B2
(45) Date of Patent: Mar. 15, 2011

(54) DUAL DIRECTION POWER AND DATA TRANSFER PROTOCOL AND SAFETY DETECTION

(75) Inventors: Norbert A. Feliss, Aptos, CA (US); Karl Arthur Flechsig, Los Gatos, CA (US); Donald Ray Gillis, San Jose, CA (US); Sylvia Lui Lee, San Jose, CA (US)

(73) Assignee: Hitachi Global Sotrage Technologies Netherlands B.V., Amsterdam (NL)

( * ) Notice: Subject to any disclaimer, the term of this patent is extended or adjusted under 35 U.S.C. 154(b) by 464 days.

(21) Appl. No.: 12/023,882

(22) Filed: Jan. 31, 2008

(65) Prior Publication Data

US 2009/0195237 A1      Aug. 6, 2009

(51) Int. Cl.
*G08B 23/00* (2006.01)
(52) U.S. Cl. .................. 340/693.6; 340/693.5; 340/500; 340/540
(58) Field of Classification Search ............... 340/693.6, 340/693.5, 500, 540, 531, 657
See application file for complete search history.

(56) References Cited

U.S. PATENT DOCUMENTS

| | | | | |
|---|---|---|---|---|
| 3,872,355 | A * | 3/1975 | Klein et al. ..................... | 361/45 |
| 5,875,087 | A * | 2/1999 | Spencer et al. .................. | 361/87 |
| 6,515,872 | B2 * | 2/2003 | Nakayama et al. ............. | 363/17 |
| 7,013,205 | B1 | 3/2006 | Hafner et al. ................... | 701/22 |
| 7,522,036 | B1 * | 4/2009 | Preuss et al. ................... | 340/531 |
| 2006/0219448 | A1 | 10/2006 | Grieve et al. ................. | 180/65.3 |
| 2006/0250902 | A1 | 11/2006 | Bender et al. ..................... | 369/1 |
| 2008/0094210 | A1 * | 4/2008 | Paradiso et al. ............... | 340/540 |
| 2009/0167537 | A1 * | 7/2009 | Feliss et al. .................... | 340/584 |

OTHER PUBLICATIONS

"TFL: High Quality Melt Temperature Sensor With Thermocouple Plug" Gncub Feb. 26, 2007.
"CalCars Frequently Asked Questions" CalCars and PHEV Frequently Asked Questions Feb. 26, 2007.
"Plug-In Hybrid Electric Vehicles" NREL: Hybrid Electric and Fuel Cell Vehicles—Plug-In Hybrid electric Vehicles Feb. 26, 2007.
Duvall, Marks S., "Battery Evaluation for Plug-In Hybrid Electric Vehicles" IEEE 2005, pp. 338-343.
Warf et al., "Battery System Requirements For Battery Dominant Hybrid Electric Vehicles: XVI. The Sixteenth Annual Battery Conference On Applications And Advance" IEEE 2001.
Cocconi et al., "Connected Cars: Battery Electrics & Plug In Hybrids" The Seattle Electric Vehicle to Grid Forum, V2G Technical Symposium, Jun. 6, 2005.
Kempton, Willet, "Vehicle to Grid Power" University of Delaware, Jun. 7, 2005.

* cited by examiner

*Primary Examiner* — Bao Q Vu
(74) *Attorney, Agent, or Firm* — Zilka-Kotab, PC (57) ABSTRACT

A device for monitoring the condition of a power outlet and for reducing or interrupting power in the event that a condition of the outlet circuitry indicates that a potentially dangerous situation exists. The device can also include a reporting function to alert a user as to the existence of the dangerous condition.

33 Claims, 10 Drawing Sheets

DUAL DIRECTION POWER AND DATA TRANSFER PROTOCOL AND SAFETY DETECTION

FIELD OF THE INVENTION

The present invention relates to circuitry for detecting degraded electrical power connector circuitry and for preventing potentially dangerous conditions resulting therefrom.

BACKGROUND OF THE INVENTION

The coming advent of plug-in hybrid electric and pure electric vehicles will soon be an integral part of the transportation system. The use of such vehicles raises a challenge that actually extends beyond the use of such vehicles, to the use of electrical appliances generally. The refueling or charging of these vehicles is from the power distribution grid, from basic duplex power connectors in homes and workplaces. The refueling or charging operation can severely strain the 120 volt duplex connections of many homes, especially if those duplex connections are very old as is the case in many homes and workplaces. While such power connectors can appear to be perfectly fine and may function for many lower demand appliances, these power connectors may have degraded over years of service, setting op dangerous situations without the knowledge of the user.

Therefore, there is a strong felt need for a device or system that can address this dangerous situation with regard to possibly old deteriorating electrical power connectors, especially with regard to the charging of electrical vehicles which draw a larger than average loads on these power connectors over extended periods of time.

SUMMARY OF THE INVENTION

The present invention provides a device for monitoring the condition of a power outlet and for reducing or interrupting power in the event that a condition of the outlet circuitry indicates that a potentially dangerous situation exists. The device can also include a reporting function to alert a user as to the existence of the dangerous condition.

The device can be incorporated into a power delivery cable such as a device for transmitting power from a power outlet to an appliance to be powered. The device can monitor a condition such as a temperature of the outlet, or can include a particle detector (smoke detector) or circuitry for measuring another parameter of the outlet circuit such as voltage, resistance etc.

The device can include a reporting function that can issue an alert in the form of an audible or visual alarm, or can report to a remote user or device, such as to a remote computer server, telephone, pager, etc.

The device can also be configured to recognize individual different outlet circuits and to store unique parameters of various individual outlets. In this way the device can retain and act upon stored information such as a unique circuit breaker trip level and, for example, adjust power delivery for an individual outlet based upon that outlet's particular needs.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a more complete understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

As discussed above, the current and future advent of appliances such as electric vehicles have the potential to strain circuits in ways not previously experienced. For Example, duplex circuits in households and workplaces can be very old and severely degraded. While this degradation may not be a problem when using appliances that draw relatively small loads or that draw loads only for a relatively short period of time, a device such as an electrical vehicle can draw very high loads over an extended period of time, such as overnight. In a degraded duplex power connector, this can cause severe Joule heating, which can ultimately result in failure of the circuit, or could even cause a fire or other catastrophic event.

The present invention provides a device or system that can want a user of the possibility of such an event, and that can prevent such an event from occurring in the first place, by regulating current flow or by giving a user advanced, warning so that repairs can be made before a degraded circuit causes a circuit failure, fire or other catastrophic event.

Figure 1:
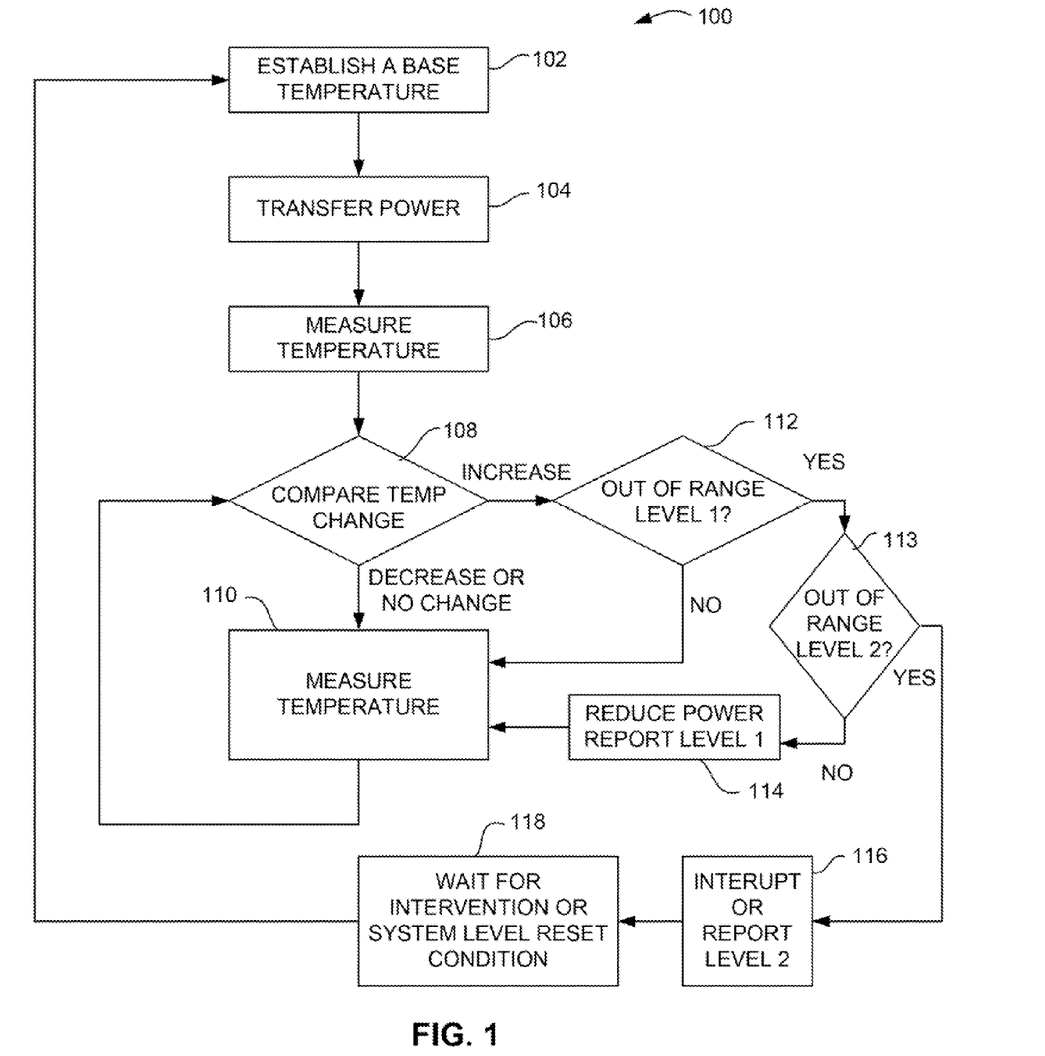
FIG. 1 is a flow chart illustrating a method for monitoring the condition of an electrical power connector circuit.

With reference to FIG. 1, in one embodiment of the invention, a device is provided that can detect degradation of a circuit and reduce power accordingly to prevent excessive heating of the circuit. The device can be a stand alone device such as a device incorporated into a power cord for delivering power to an appliance or could be incorporated into an electrical power connector itself.

The device includes circuitry or logic 100 for determining that a temperature has reached an excessive level. First in a step 102 abase temperature can be established. This can be set by an operator or could be preset, such as to manufacture's specifications or by some other method. Then, in a step 104 power is transferred to an appliance of choice such as an electric vehicle. In a step 106, a temperature of the circuitry is measured and then, in a step 108 the current temperature of the circuit is compared with the base temperature to determine a temperature change or delta temperature (difference between the base temperature and die current temperature). If there is no temperature change, or if the temperature decreases, then the system continues to step 110 to continue detecting the temperature of the circuit, for continued comparison with the base temp (returning to step 108).

If however, it is determined that the temperature has increased, the system continues to a decision step 112 to determine whether the temperature increases is beyond a predetermined acceptable first range or threshold (level 1). If the temperature increase is within an acceptable first range or threshold, then the system continues to step 110 to continue monitoring the temperature. If, however, the temperature increase exceeds the acceptable first range or threshold (level 1), then the system continues to step 113 to determine whether the temperature increase exceeds a second range or threshold (level 2). If no, then the system continues to step 114 to limit or interrupt power to the device and to, warn, report and report that level 1 has been exceeded. The system then returns to step 110 to continue monitoring the temperature of the circuit and monitoring the temperature change (step 108) to determine whether the decrease in power output was sufficient to reduce the temperature of the circuit to an acceptable level.

If the answer to step 113 is yes (level 2 has been exceeded), then the system continues to step 116 to interrupt power to the appliance, and alert and report that level 2 has been exceeded. The system then continues to step 118 to wait for an intervention, such as a circuit breaker reset, or for system level reset condition. Thereafter, the system returns back to initial step 102.

Figure 2:
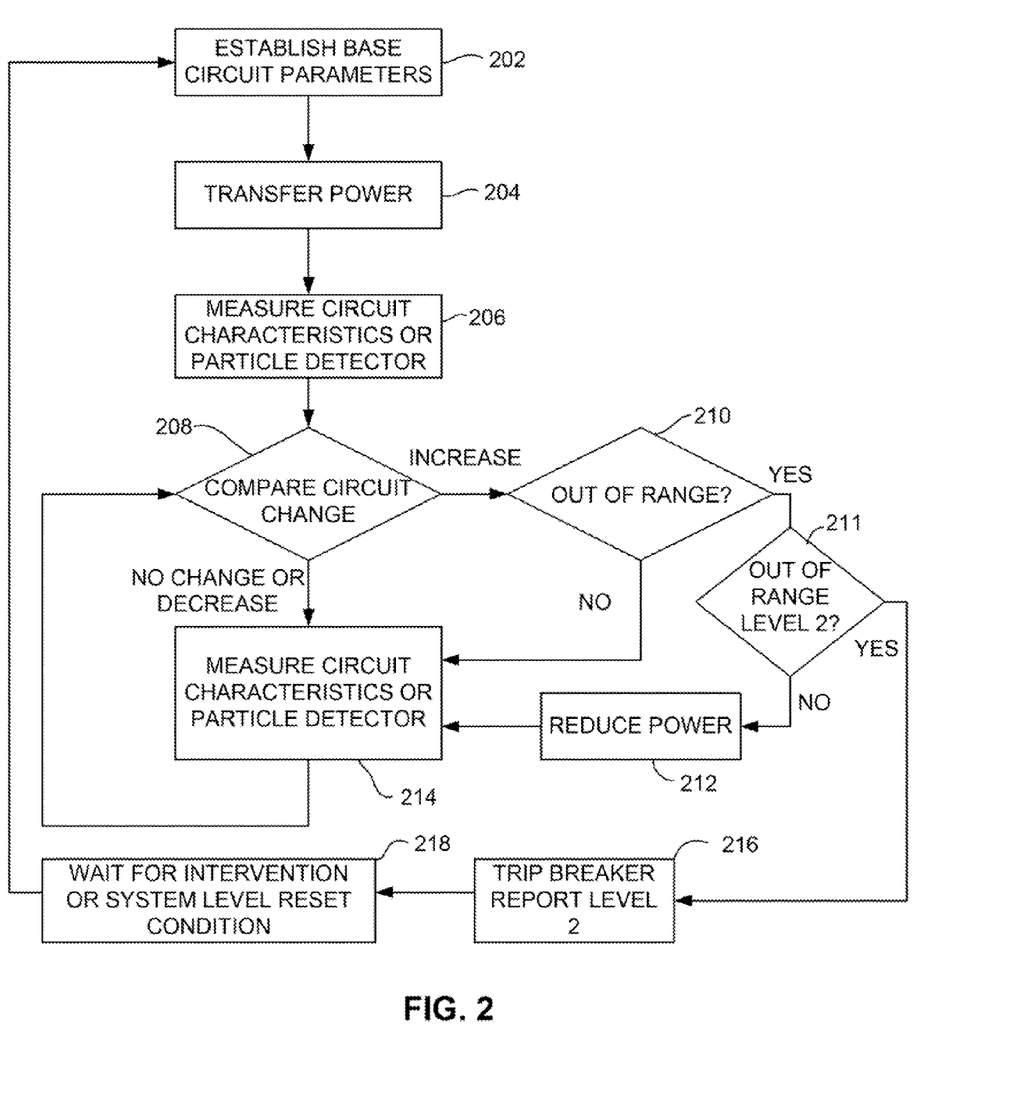
FIG. 2 is a flow chart, according to an alternate embodiment of the invention, for monitoring the condition of an electrical power connector circuit.

With reference now to FIG. 2, a device can be implemented to monitor the safety of a circuit by measuring parameters of the circuit itself. Such parameters can include, for example, the initial resistance of the circuit, the dynamic impedance of the circuit, and the initial voltage at time=0 compared to the voltage at the present time etc. This can also include a smoke or particle detector to determine if the circuit is close to a flammable temperature point. With this in mind, in a step 202 base parameters for the circuit are established. As mentioned above, these can be parameters such as resistance, impedance and voltage, etc. Then, in a step 204, power is transferred to an appliance. While this power is being transferred, the relevant circuit parameters are measured in a step 206. Then, in a step 208 the measured circuit parameters are compared with the base circuit parameters and a determination is made as to whether or not the parameters have changed in a manner that might indicate circuit degradation. For example, an impedance or voltage drop of a circuit could indicate degradation of the circuit. If circuit parameter changes indicate circuit degradation, then the system continues to step 210 where a determination is made as to whether the circuit changes are beyond an acceptable first range (level 1). If no, then the system continues to step 214 to continue measuring circuit characteristics. If yes, then the system continues to step 211 to determine whether tire circuit parameters are beyond a second range (level 2). If no, then the system continues to step 212, to reduce power delivered through the circuit and to report that level 1 has been exceeded. The system then continues to step 214 If in step 211 it is determined that the circuit parameters have indeed exceeded the second range or threshold (level 2), then the system continues to step 218 to interrupt power, such as by tripping a circuit breaker and to report that level 2 has been exceeded. The system then continues to a step 218 to wait for an intervention, such as resetting a circuit breaker, or for a system level reset condition. When the system has been reset, then the system can continue back to the initial step 202.

Figure 3:
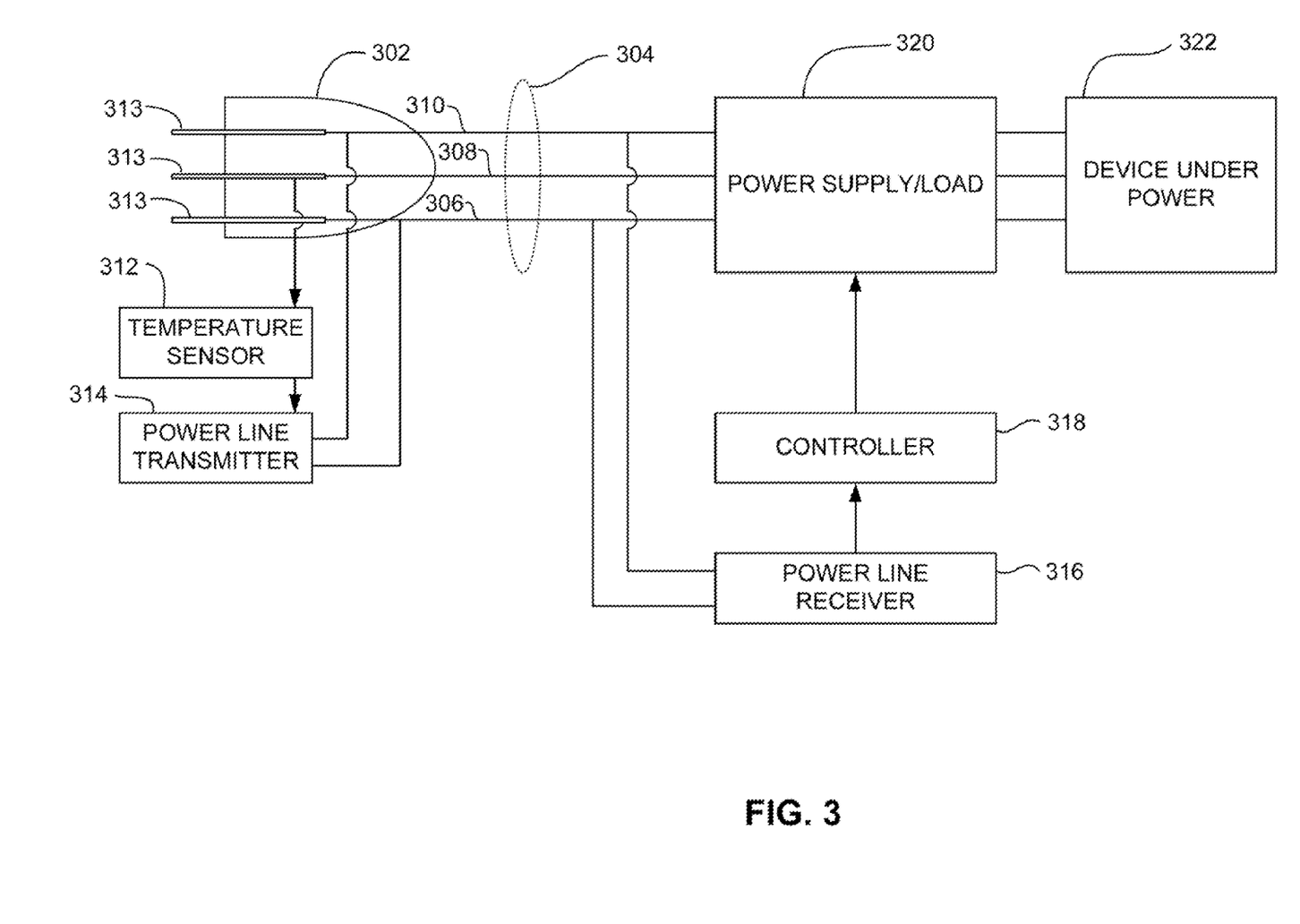
FIG. 3 is a schematic illustration of a device for supplying power to an appliance and for monitoring the condition of an electrical power connector into which the device is connected.

Device Side Monitoring of Circuit Condition:

As mentioned above, the invention can be embodied in a device that can connect into a power connector to monitor the condition (ie. deterioration) of a power connector circuit. In this case, the device could be incorporated into a power cord, or similar device that can plug into an electrical power connector and into an appliance (such as an electric vehicle to be charged). With reference, then, to FIG. 3, a power plug 302 is provided that can plug into a power connector (not shown) such as a 110 or 220 volt power connector of a home or place of business. The power plug 302 is connected with a power cord 304 that includes first, second and third electrical lines 306, 308, 310, that can include a hot line 310, a neutral line 306 and a ground line 308 for single phase lines and the appropriate line regulation for 3-phase lines. According to this embodiment of the invention, the lines 306, 308, 310 of the power cord 304 can be used to deliver a signal to a power simply/load 320. To this end, a signal from the temperature sensor 312 is delivered to a power line transmitter 314, which generates a signal corresponding to the temperature of the tine 313 or conductor 306, 308, 310 of the power plug 313. This signal from the power line transmitter is fed to one or more of the lines 306, 308, 310 of the power cord, where it is transmitted to a power receiver 316. The power receiver reads the signal delivered from the power line transmitter (via the lines 306, 310) and delivers a signal to a controller 318. Therefore, the temperature sensor 312 is in communication with the controller 318. If the sensed temperature is too large (indicating degradation of the circuit) the controller can send a signal to the power supply/load to adjust (eg. reduce) the power delivered (to/from) the device being powered or charged 322. The power source can be, for example, a voltage regulator or current regulator and also may include a transformer. It should also be pointed out that, while the device is being described as a device that detects a temperature increase, the device could also be constructed to detect and respond to one or more other circuit parameters, such as impedance or voltage, such as discussed with reference to FIG. 2.

Figure 4:
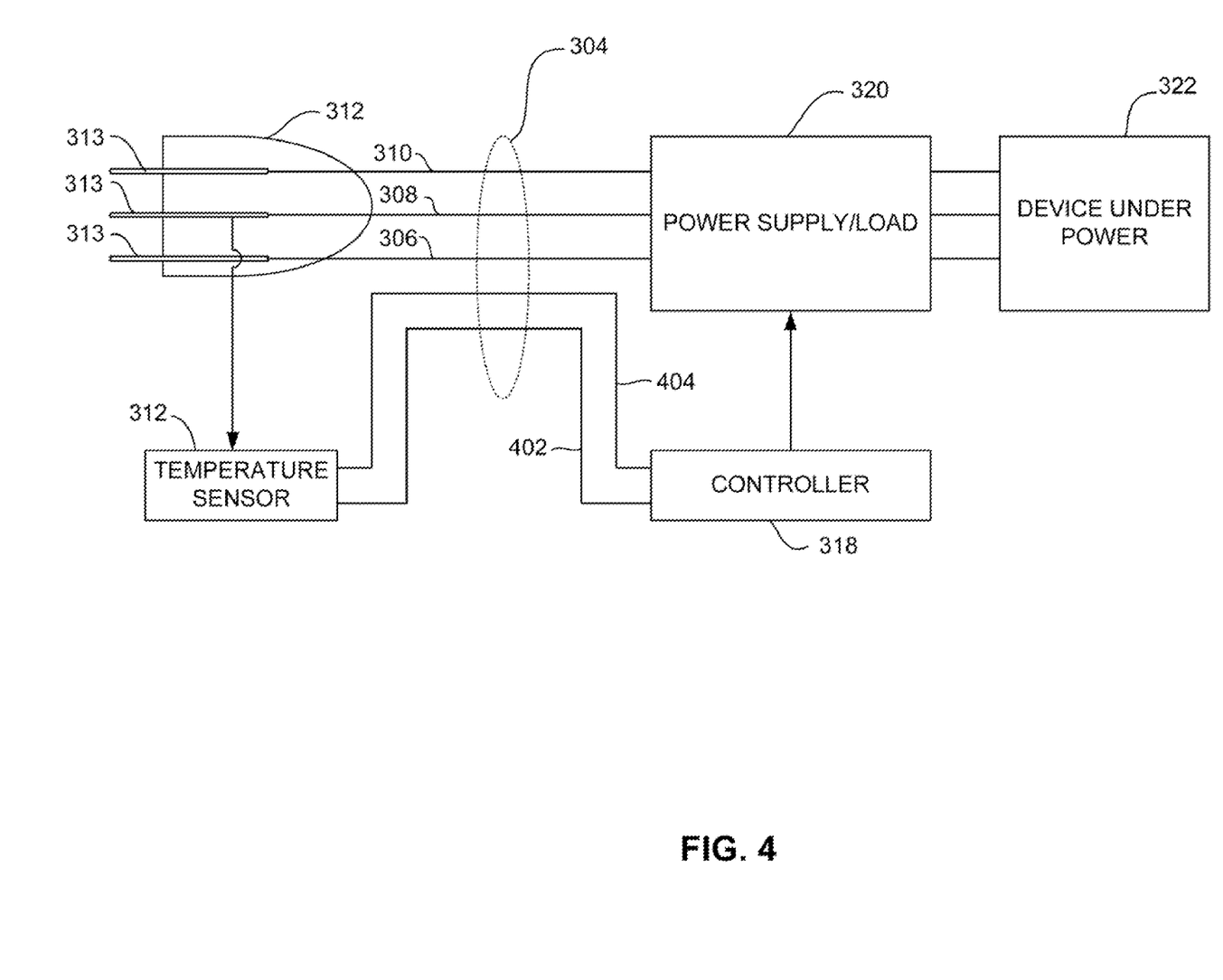
FIG. 4 is a schematic illustration of a device according to another embodiment of the invention for supplying power to an appliance and for monitoring the condition of an electrical power connector into which the device is connected.

With reference now to FIG. 4, another embodiment of the invention does not use the leads of the power cord 304 to transmit circuit or temperature data. According to this embodiment of the invention, a temperature signal is delivered from a tine 313 of the power plug 302 to a temperature sensor 314. The temperature sensor 314 is in communication with the controller 318. One or a pair of leads 402, 404 delivers a signal from the temperature sensor directly to the controller 318, which can deliver a signal to the power supply/load to adjust the power (e.g. lower the current) to the device being powered 322 in the event that a temperature increase (or other circuit data) indicates degradation of the power connector circuit (not shown).

One or more of the conductors 302 (or some other relevant part of the power connector 313) is connected with a temperature sensor 312 such as a thermistor. It should be pointed out that the invention is being described as using a temperature sensor 312, however the temperature sensor could be replaced with another device that can monitor some other parameter of the circuit such as a voltage or impedance. Therefore, as an alternative to a temperature sensor the circuit sensor could be a voltmeter or ohmmeter.

Figure 5:
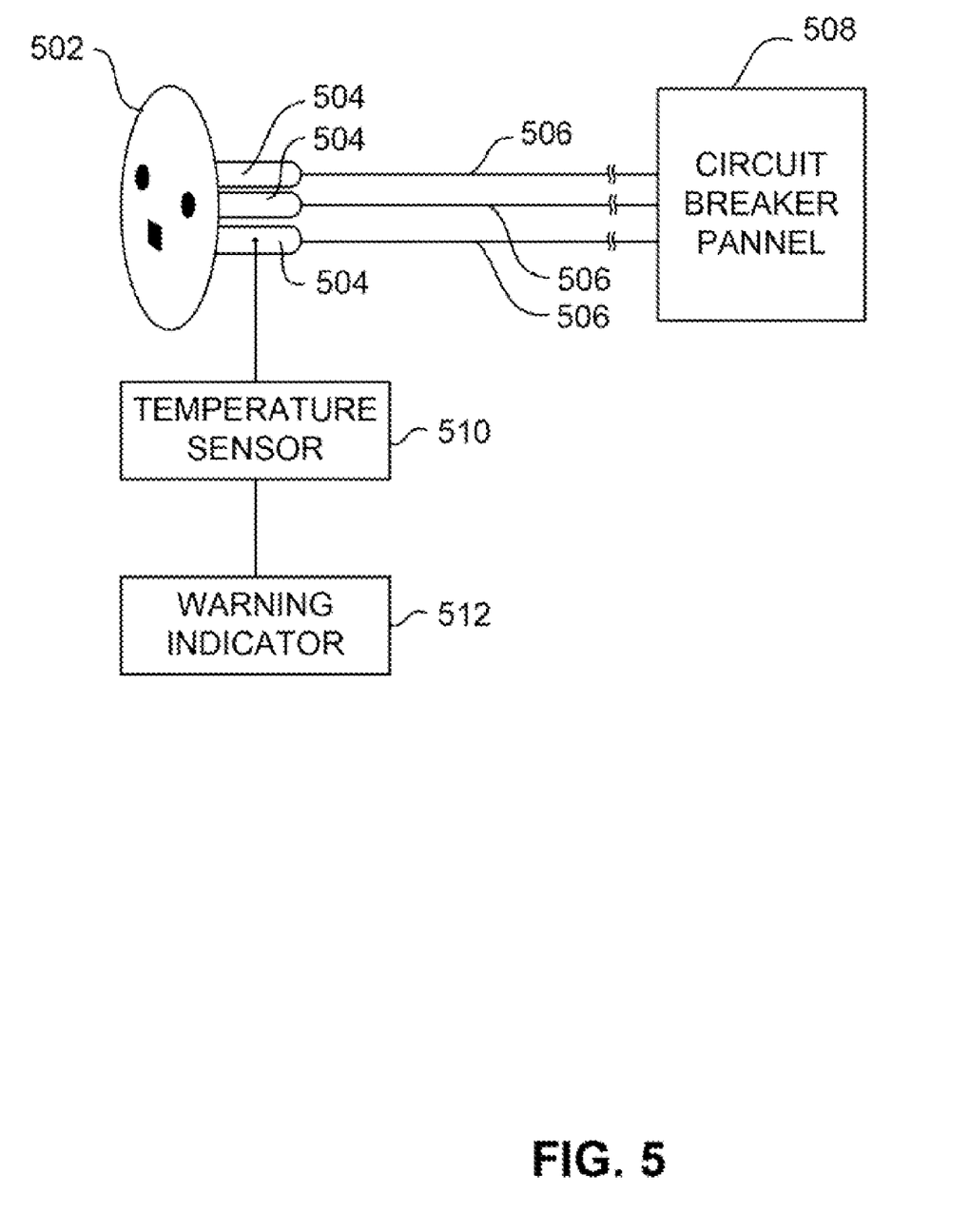
FIG. 5 is a schematic illustration, according to an embodiment of the invention, of a circuitry incorporated into or connected with an electrical power connector for monitoring the condition of the electrical power connector.

With reference to FIG. 5, the temperature sensor 510 monitors the temperature of the power outlet 502 and, if the temperature exceeds a certain predetermined threshold, the temperature sensor 510 sends a signal to a warning indicator 512, which is activated to alert a user of a dangerous condition. The warning indicator 512 can be a visual display (such as an LED) display, or could be an audible warning such as an alarm. Furthermore, the warning indicator need not be located directly at the location of power connector, but could be a remote device that can warn a user such as a home owner at some remote location, or could alert a centralized agency such as a local fire department, alarm company, etc. that a potentially dangerous situation exists. The outlet 502 can also be connected via power lines 506 with a circuit breaker panel 508 which can function to interrupt power to the outlet 502 in the event that the current exceeds a desired threshold, thereby providing additional protection.

Circuit Recognition:

According to another possible feature of the invention, the device for monitoring the circuit condition, such as described above with reference to FIG. 8, can also include circuitry for recognizing a power connector to which it has been previously plugged into. Various mechanisms can be implemented for allowing the device to recognize a power connector circuit. For example, the device can include circuitry that is capable of communicating with an active circuit, or that can read and remember a spectral signature of a passive electrical circuit. Such identification can include identification based on distance information for nodes or features which relate distance coordinates and information about the circuit. A time domain reflectometer (TDR) can also be used to help to identify a circuit. In addition, a simple bar code and bar code reader can be used to identify and determine the ID of the circuitry that is being used.

In addition, the device can include circuitry that can identify a circuit geographically, such as based on GPS identification of a location of a circuit. The circuit could also be identified by an RFID tag built into the power connector circuit.

Figure 8:
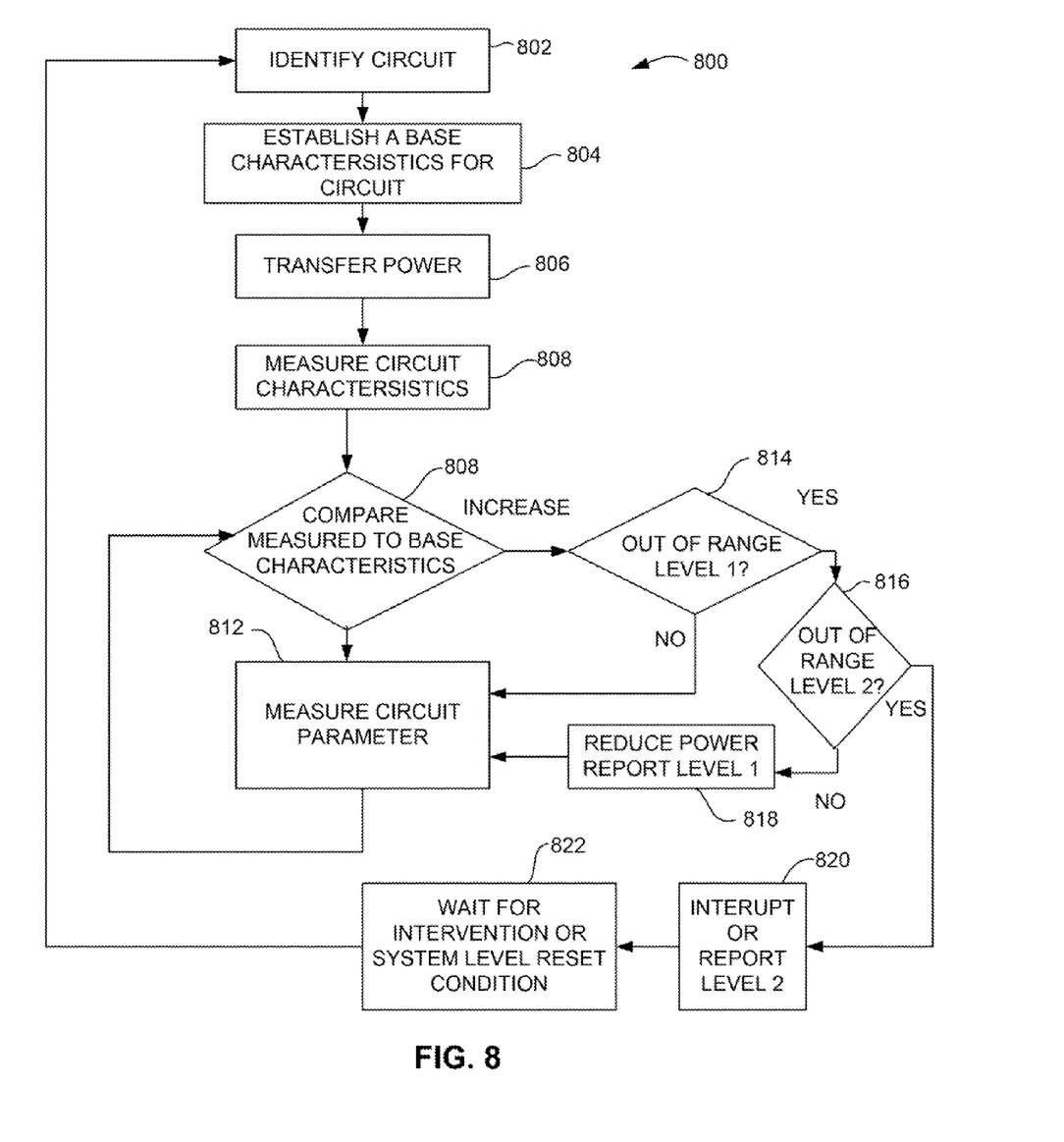
FIG. 8 is a flow chart illustrating a system for implementing an embodiment of the invention.

Therefore, with reference to FIG. 8, a system 800 is provided for monitoring a the conditions of various individual power connectors by recognizing the power connector into which it has been connected. In a step 802, the system identities a circuit into which it has been connected. This can be accomplished, for example, by one or more of the methods described above, such as communication with an active circuit, recognition of a spectral signature of a circuit, reading a bar code, etc. Then, in a step 804, a base characteristic is either established (if the circuit has never been connected to before) or is recalled from a memory if the circuit has been connected to before. Then, in a step 806 power is transferred.

Then, in a step 808 one or more circuit characteristics are measured. These circuit characteristics are compared with the base characteristics of the circuit in a step 810 to determine whether the characteristics have increased or changed in a manner indicated circuit degradation. If no, then the circuit continues to step 812 to continue measuring the circuit characteristics. If the answer to decision step 810 is yes, then, the system continues to a step 214 to determine whether the circuit characteristics have exceeded a first threshold (level 1). If no, then the system continues to step 812. If yes, then the system continues to step 816 to determine whether the circuit characteristics have exceeded a second threshold (level 2). If no, then the system continues to step 818 to reduce power and report level 1. If yes, then the system continues to step 820 to interrupt power and to report level 2. The system then continues to step 822 to wait for intervention or reset.

Figure 9:
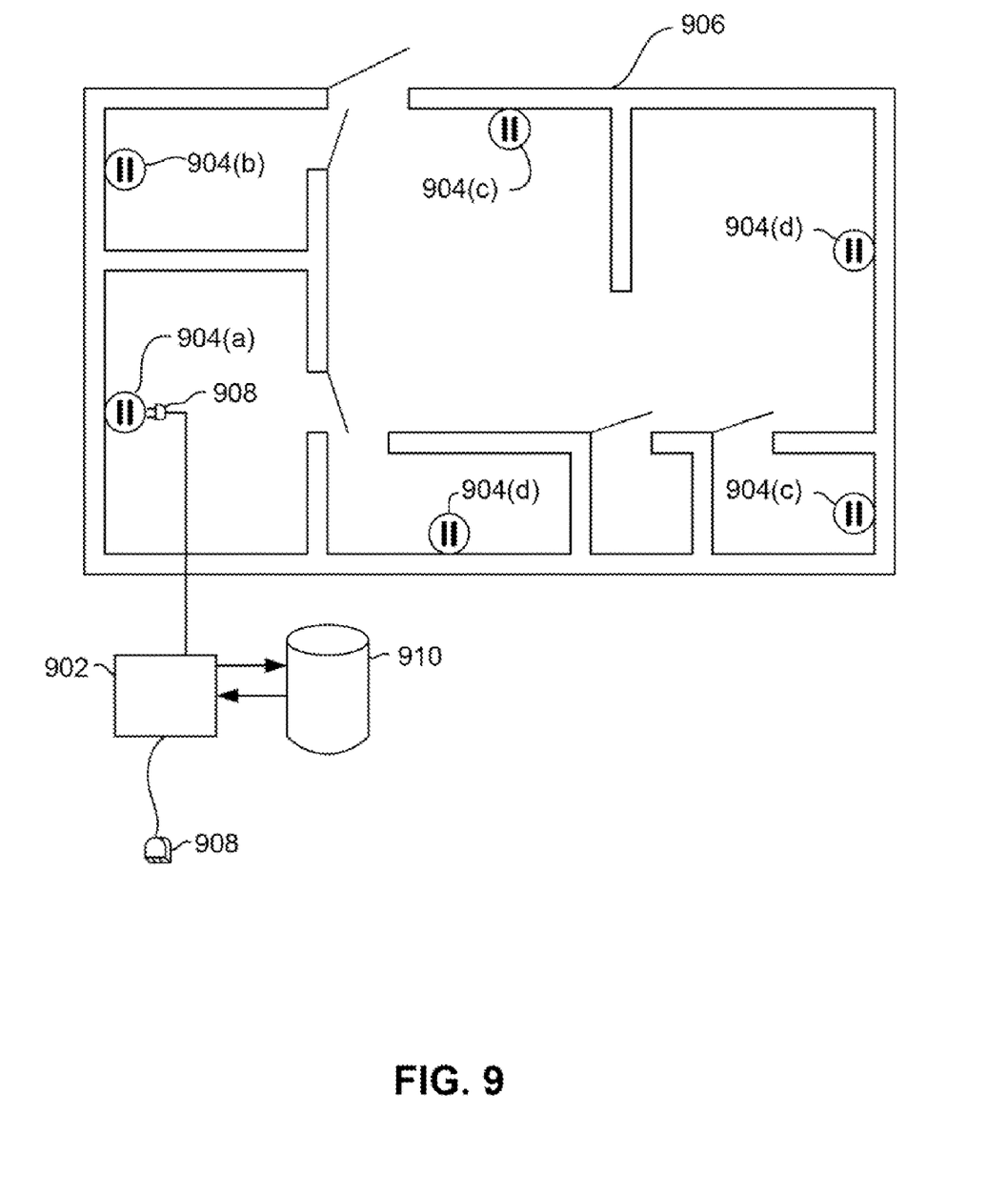
FIG. 9 is a schematic illustration of a device according to an embodiment of the invention for use with multiple electrical outlets.

FIG. 9 shows a device 902 connected with an outlet 904(a) of a building 906. As can be seen, the building or structure 906 has various outlets 904(a-f), each having its own characteristics and service condition. The device 902 includes circuitry that is functional to recognize each of the individual outlets 904(a-f), and while the device 902 is shown with reference to outlets 904(a-f) of a given structure 906, this is by way of example, and the device is not limited to use with a single dwelling, and would be capable or recognizing outlets in other locations, not associated with the structure 906. The device 902 can include a connector 908 that is capable of connecting with an outlet 904(a), and for transmitting power from the outlet 904(a) to die to a power connector 906 to deliver power to an appliance. As mentioned above, the device includes circuitry for recognizing the each outlet. This can accomplished such as recognizing the geographical location of the outlet 964(a) such as by Global Position System (GPS). The recognition of the outlet 904(a) can also be through an RFID tag associated with the outlet, by recognition of the spectral signature of the outlet 904(a) or some other method.

Various parameters of a circuit, such as grid parameters and important characteristics of the outlet circuit 904(a) can be retained in an internal memory 910 of the device 902. The memory 910 can be for example, a flash memory or hard disk drive. Such characteristics can also include circuit breaker trip levels, which can be used to prevent a second circuit breaker trip.

The device can also include circuitry for calculating and storing (in memory 910) optimal usage settings for a circuitry associated with an outlet 904(a), which can include optimal settings for multiple power connectors when a plurality of appliances are being powered or charged. As mentioned above, simple flash storage 910 can be used as this point from the supply side or receptacle to include these critical circuitry parameters, i.e. retained memory of the internal circuit, grid parameters and important communication characteristics for the house and user. This can include the detection of and calculation of changes that would exist if additional loads are also on the circuit such as from multiple power connectors being used in the structure 906.

Figure 10:
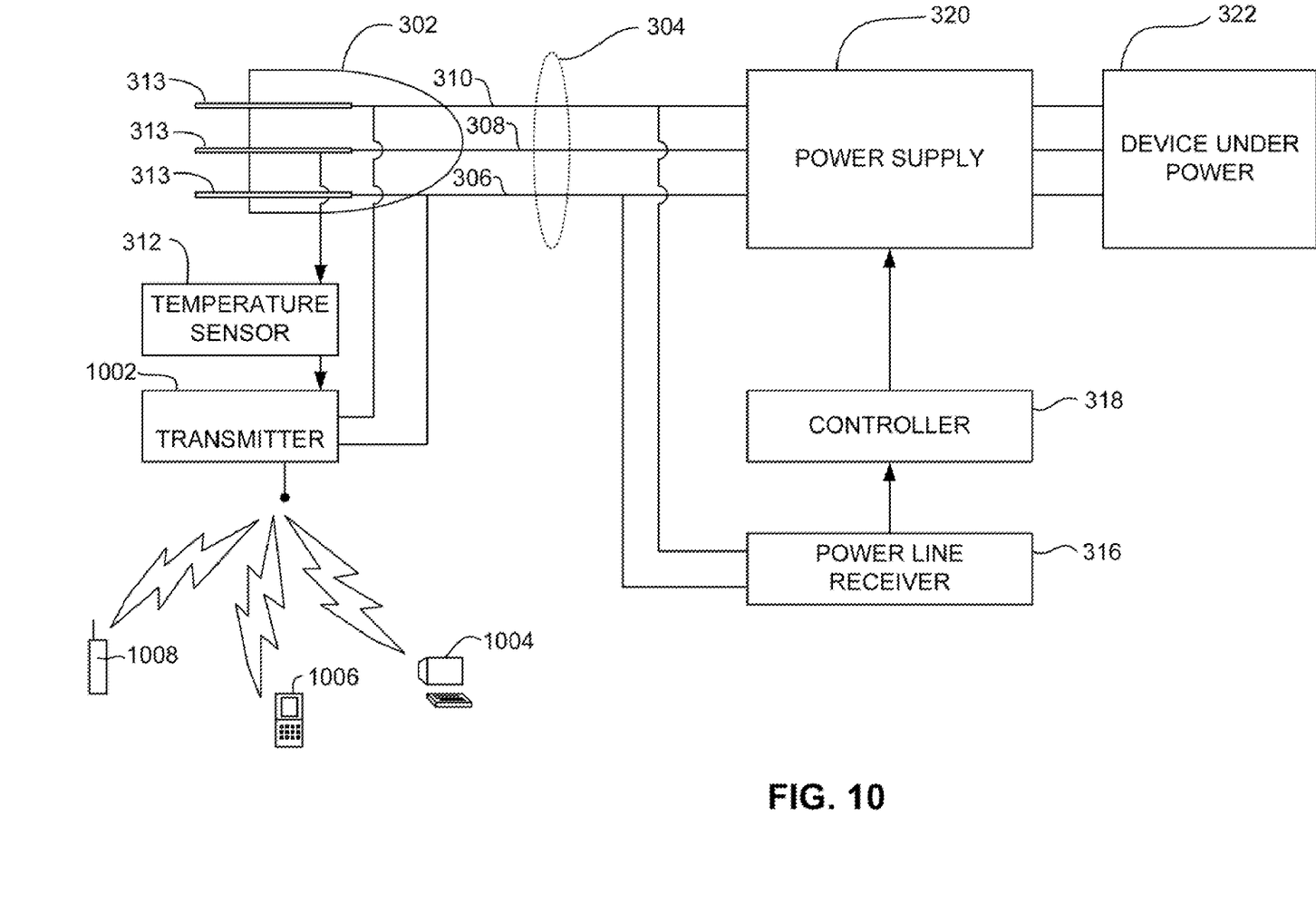
FIG. 10 is schematic illustration of a device according to yet another embodiment of the invention.

FIG. 10 is a schematic representation of a possible implementation of the invention, similar to FIG. 3, except that the device can communicate remotely to report, a dangerous or potentially dangerous condition. As shown in FIG. 10, the device can include a transmitter 1002 that is capable of communicating with a remote device, such as but not limited to a remote computer or computer network or system 1004, telephone, such as cell phone or land line phone 1006, pager 1008 or some other remote device. In this way, the device can alert a remote user, such as a local fire department or agency, alarm company building owner, etc. of a potentially dangerous condition. Also, while the device itself can issue a command (such as via the transmitter power line receiver 316) to adjust the power delivery as needed, the power line receiver 316 can also receive a signal from one or more of the remote services 1004, 1006, 1008 to adjust the power as needed to avoid a hazardous situation.

Figure 6:
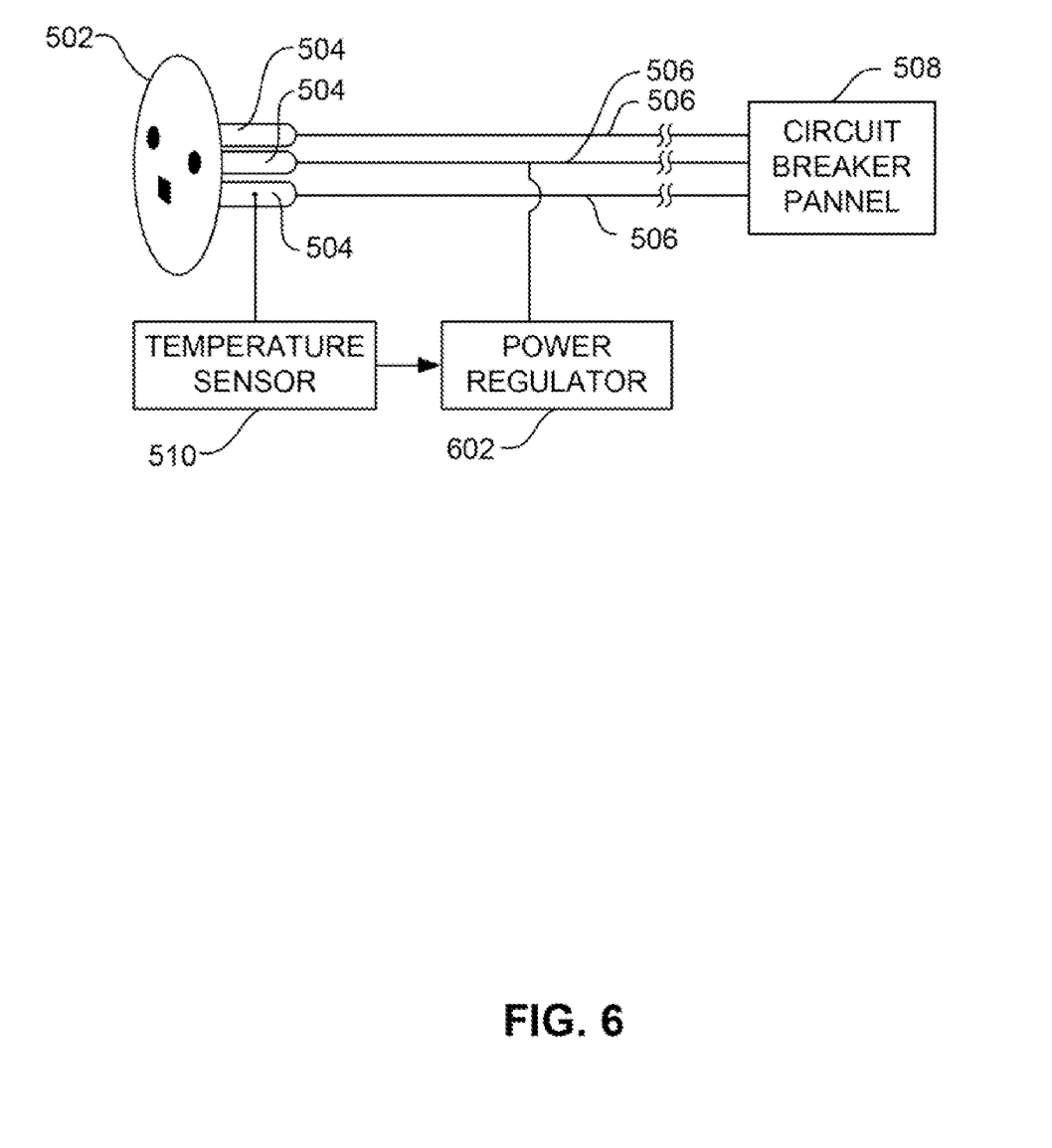
FIG. 6 is a schematic illustration, according to an alternate embodiment of the invention, of a circuitry incorporated into or connected with an electrical power connector for monitoring the condition of the electrical power connector.

With reference now to FIG. 6, according to another embodiment of the invention, a temperature sensor 510 (or other circuit monitoring device as mentioned above) is connected with a line 506 of the power outlet 502 or with some other portion of the outlet 502, such as one or more of the connectors 504. In the event that the temperature (or other circuit parameter) exceeds a predetermined threshold, the sensor 510 sends a signal to a power regulator 602, which is connected in series with one or more of the electrical lines 506. The power regulator 602, which can be a voltage regulator, current regulator, etc., upon receiving the signal from the sensor 510 functions to reduce the amount of current delivered to the power connector 504. The sensor then continues to monitor the power connector 504, and if the dangerous condition persists, the sensor 510 continues to send a signal to the power regulator 602 to further reduce power to the power connector 504. If in the extreme situation, turn off the power altogether.

Figure 7:
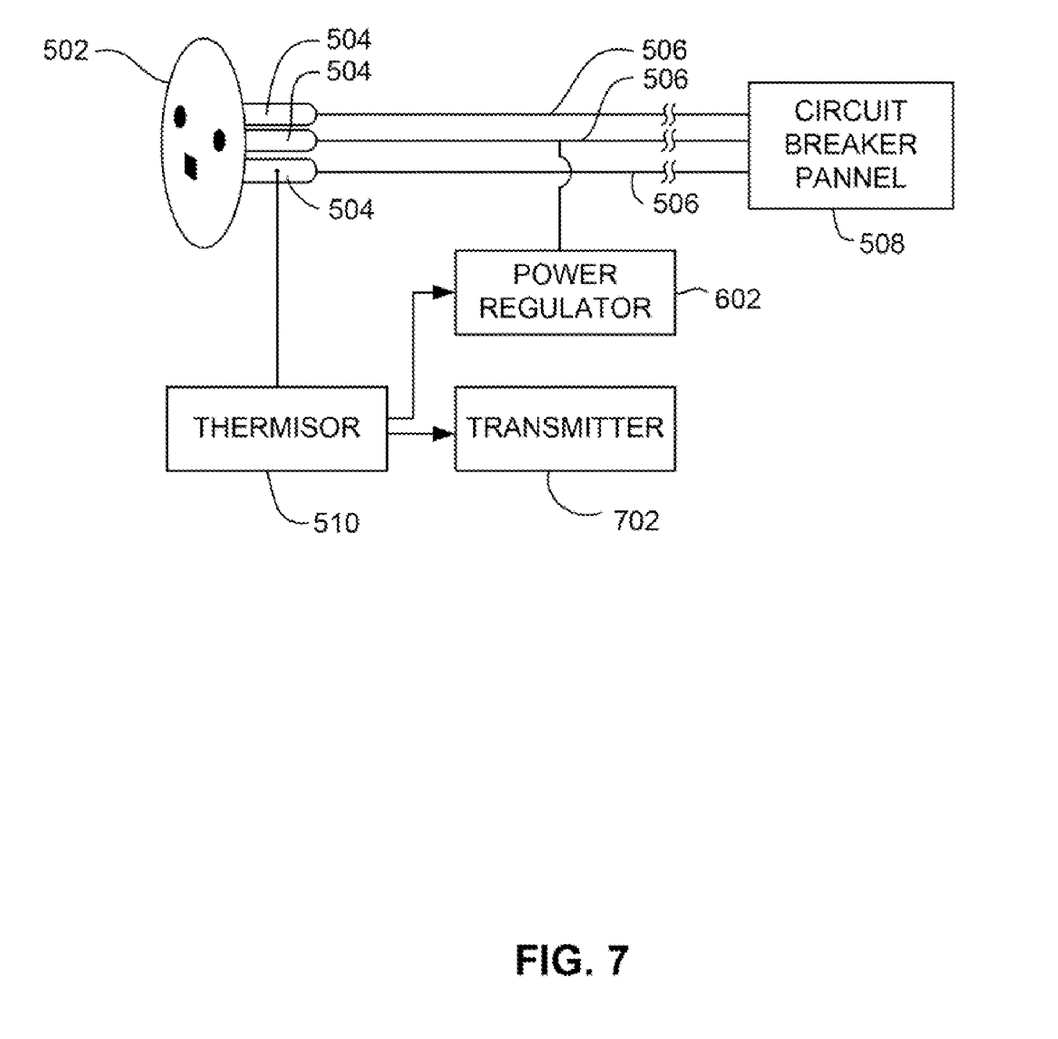
FIG. 7 is a schematic illustration, according to yet another embodiment of the invention, of a circuitry incorporated into or connected with an electrical power connector for monitoring the condition of the electrical power connector.

With reference now to FIG. 7, according to another embodiment of the invention, when the temperature sensor (or other circuit monitoring device) detects a potentially dangerous situation such as a temperature exceeding a predetermined threshold, then the temperature sensor sends a signal to a power regulator 602 to reduce the current delivered to the power connector 504, as describe above, with reference to FIG. 6. In addition however, the sensor 510 sends can send a signal to a transmitter that can send a signal (such as by an RF signal) to notify an appropriate user or agency of a potentially dangerous situation. Such a transmitted signal could be a signal to a fire department or alarm company, or could be, for example, a message delivered (for example) via cell phone or email to a home owner or other user.

While various embodiments have been described above, it should be understood that they have been presented by way of example only, and not limitation. Other embodiments failing within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. An apparatus for supplying power to an appliance, the apparatus comprising:
   power plug, having a plurality of tines;
   a power cord connected with the plurality of tines;
   a temperature sensor connected with the power plug; and
   a controller, in communication with a the temperature sensor to receive a signal corresponding to the temperature of the power plug, the controller being operable to control an amount of power delivered through the power cord if the signal from the temperature sensor exceeds a predetermined threshold.

2. An apparatus as in claim 1 wherein the temperature sensor is a thermal sensing circuit.

3. An apparatus as in claim 1 wherein the temperature sensor is connected with a tine of the power plug.

4. An apparatus as in claim 1 wherein the temperature sensor is a thermistor that is connected with a tine of the power plug.

5. An apparatus as in claim 1 wherein the communication between the temperature sensor is provided by at least one electrical lead that electrically connects the temperature sensor with the controller.

6. An apparatus as in claim 1 wherein the power cord comprises a plurality of electrically conductive leads used as sensor data lines;
   a power line receiver, electrically connected with the at least one lead of the power cord and also connected with the controller, the power line transmitter and power line receiver providing the communication between the temperature sensor and the controller.

7. An apparatus as in claim 1 further comprising circuitry for identifying a power connector into which the plug has been connected.

8. An apparatus as in claim 1 further comprising circuitry for identifying an electrical circuit receptacle into which the a plug has been connected based upon a spectral signature of circuitry associated with the power connector.

9. An apparatus as in claim 1 further comprising circuitry for recognizing an power connector into which the plug has been connected, by recognizing an RFID tag associated with the power connector.

10. An apparatus as in claim 1 further comprising circuitry for recognizing a power connector into which the plug has been connected based on geographical data provided by a global positioning satellite (GPS) system.

11. An apparatus as in claim 1 further comprising circuitry connected with the temperature sensor for alerting a user if a sensed temperature exceeds a predetermined threshold.

12. An apparatus as in claim 1 further comprising circuitry for recognizing and storing circuit parameters of an power connector into which the plug is connected, wherein storage is used to retain these critical circuitry parameters.

13. An apparatus as in claim 1 wherein the circuit parameters include a power level for a circuit breaker trip level of a circuit breaker associated with the power connector.

14. An apparatus for supplying power to an appliance, the apparatus comprising:
   power plug, having a plurality of tines;
   a power cord connected with the plurality of tines;
   a circuit parameter disconnected with the power plug; and connected with the temperature sensor and communicate to alert a user if a sensed temperature exceeds a predetermined threshold.

15. An apparatus for supplying power to an appliance, the apparatus comprising:
   power plug, having a plurality of tines;
   a power cord connected with the plurality of tines;
   a detection circuitry, connected with the power plug, the detection circuitry being functional to monitor a circuit parameter; and
   a controller, in communication with a the detection circuitry to receive a signal corresponding to the circuit parameter, the controller being operable to control an amount of power delivered through the power cord if the signal from the detection circuitry exceeds a predetermined threshold.

16. An apparatus as in claim 15 wherein the circuit parameter comprises an impedance of an outlet into which the plug is connected.

17. An apparatus as in claim 15 wherein the circuit parameter comprises a voltage drop between the plug and an outlet into which the plug is connected.

18. An apparatus as in claim 15 further comprising circuitry for alerting a user if the circuit parameter exceeds the predetermined threshold.

19. An apparatus as in claim 15 further comprising, circuitry for storing and recalling the circuit parameters.

20. An apparatus as in claim 15 further comprising circuitry for recognizing an outlet into which the plug is connected.

21. An apparatus as in claim 15 further wherein the detection circuitry comprises circuitry for measuring a voltage of an electrical outlet.

22. An apparatus as in claim 21 further comprising circuitry for determining that an excessively high resistance exists when circuitry for measuring the voltage detects a predetermined voltage threshold has been reached.

23. An apparatus as in claim 21 further comprising circuitry operable to identify the signature of the circuit via a Time Domain Reflectometer or Spectral Signature to give an identification of the location where there is a problem.

24. An apparatus as in claim 1 further comprising Emergency Override circuitry that is functional to provide control of power when a temperature exceeds a threshold and that provides information that is useful for diagnostics.

25. An apparatus as in claim 15 further comprising:
   logic for determining that the circuit parameter has exceeded a first parameter threshold and for reducing power delivery and reporting that a first level has been exceeded in the event that the circuit parameter has exceeded the first threshold; and
   logic for determining that the circuit parameter has exceeded a second parameter threshold and for interrupting power delivery in the event that the circuit parameter exceeds the second parameter threshold.

26. An apparatus as in claim 25 further comprising logic for reporting that the second parameter threshold has been exceeded.

27. An apparatus as in claim 25 further comprising logic for identifying a unique circuit breaker and for communicating an imminent trip condition of the unique circuit breaker.

28. An apparatus as in claim 25 that allows the power to be transferred to a power distribution grid.

29. An apparatus as in claim 15 further comprising circuitry for remotely reporting a circuit condition based on the circuit parameter, the remote reporting being delivered to one or more of the following: computer email, wireless pager, computer network server/webpage, and hardware landline phone link.

30. An apparatus as in claim 1 further comprising circuitry for remotely reporting a circuit condition based on the circuit parameter, the remote reporting being delivered to a computer server broadcasting a webpage to display adjustable parameters for all critical links to the home circuitry, the adjustable parameters including one or more of the status of mechanical and electrical faults of the circuitry; transmission of critical information to other users in case of pending alarm conditions; and the number of power connections with specified locations of each power connection.

31. An apparatus as in claim 15 further comprising data storage and circuitry for identifying a specific circuit and for storing information regarding the circuit.

32. An apparatus as in claim 31 wherein the specific circuit information includes a circuit breaker trip level, the device further including circuitry for keeping power delivery below the circuit breaker trip level.

33. An apparatus as in claim 1 further comprising the linkage to a computer server broadcasting a webpage to display adjustable parameters for all critical links to the home circuitry, these can include the status of mechanical and electrical faults of the circuitry, and transmission of critical information to other users in case of pending alarm conditions (i.e., unsafe temperatures have been reached), wherein the number of power connections are also displayed which give the specifics of each location and includes the before and after power levels after setup.

* * * * *